United States Patent [19]

Nakamura et al.

[11] Patent Number: 5,282,124
[45] Date of Patent: Jan. 25, 1994

[54] POWER UNIT HAVING OVERCURRENT/UNDERVOLTAGE-RESPONSIVE PROTECTIVE FUNCTION

[75] Inventors: Masashi Nakamura; Motohiro Shimizu, both of Wako, Japan

[73] Assignee: Honda Giken Kogyo Kabushiki Kaisha, Tokyo, Japan

[21] Appl. No.: 906,387

[22] Filed: Jun. 30, 1992

[30] Foreign Application Priority Data

Jul. 9, 1991 [JP] Japan .................. 3-194901

[51] Int. Cl.⁵ ............... H02M 5/458; H02H 7/122
[52] U.S. Cl. ............................... 363/36; 363/56; 361/92
[58] Field of Search ............. 363/36, 37, 56; 361/92; 322/1, 90; H02M 5/458

[56] References Cited

U.S. PATENT DOCUMENTS

| | | | |
|---|---|---|---|
| 4,412,267 | 10/1983 | Hansen | 361/92 |
| 4,751,629 | 6/1988 | Shimizu et al. | 363/37 |
| 4,797,800 | 1/1989 | Shimizu | 363/37 |
| 4,918,592 | 4/1990 | Shimizu | 363/50 |
| 4,973,896 | 11/1990 | Shiga et al. | 322/90 |
| 5,093,611 | 3/1992 | Nakamura et al. | 322/90 |

FOREIGN PATENT DOCUMENTS

| | | | |
|---|---|---|---|
| 59-132398 | 9/1984 | Japan | H02M 5/45 |
| 60-82098 | 5/1985 | Japan | H02M 7/48 |
| 63-114527 | 5/1988 | Japan | H02H 7/122 |
| 3-93499 | 4/1991 | Japan | H02P 9/04 |

Primary Examiner—William H. Beha, Jr.
Attorney, Agent, or Firm—Frishauf, Holtz, Goodman & Woodward

[57] ABSTRACT

In a power unit, an output current supplied from the power unit to a load device is constantly detected as a load current. When the detected load current exceeds a predetermined current value, output power supplied from the power unit to the load device is reduced or cut off. An output voltage supplied from the power unit to the load device is constantly detected. When the detected output voltage has continued to be lower than a predetermined voltage value over a predetermined time period, the output power is reduced or cut off.

8 Claims, 7 Drawing Sheets

POWER UNIT HAVING OVERCURRENT/UNDERVOLTAGE-RESPONSIVE PROTECTIVE FUNCTION

BACKGROUND OF THE INVENTION

1. Field of the Invention

This invention relates to a power unit, and more particularly to a portable AC power unit.

2. Prior Art

In recent years, portable AC power units have been increasing in number which are equipped with invertor devices for stabilizing the output frequency. For example, a portable power unit which generates AC power having a commercial frequency by means of an AC generator driven by an engine is known, e.g. by Japanese Provisional Utility Model Publication (Kokai) No. 59-132398, in which the engine is operated within a high speed range to cause the AC generator to generate high AC output, the output is converted into direct current, then the direct current is converted into alternating current by an invertor device, and the alternating current is outputted.

There is a demand for AC power units of this kind whose output waveform is as close to a sine wave as possible dependent upon their application. To this end, an attempt has been made to employ an invertor device of the pulse width-modulation type as the above-mentioned invertor device (Japanese Provisional Patent Publication (Kokai) No. 60-82098).

In engine generators of this kind, there have been used various kinds of protective means for protection of the output circuit. However, depending on the output characteristics and load characteristics of the generator, there is the possibility that the amount of load current outputted from the generator does not directly represent the state of load, which has spoiled the perfectness of conventional protection systems using the amount of load current as a direct indicator of the state of load. For example, in a protection system which is adapted to merely cut off power output from the engine generator when the load current has increased above a critical level, if a load device, such as an electric motor, is connected to the output circuit of the generator, and into which a large amount of electric current temporarily rushes when it is started, there is the possibility that power cut-off is carried out to a greater extent or more frequently than required, at the start of the load device. Therefore, such a system does not form the optimum protection system for output circuit protection.

Under these circumstances, the present assignee has already proposed, in Japanese Provisional Patent Publication (Kokai) No. 63-114527, a protection system for invertor-controlled type generators, which is capable of starting a load device such as an electric motor, by interrupting the power supply from the generator only over a predetermined time period when an overcurrent state in which the amount of load current exceeds a predetermined reference value is detected, and then resuming the power supply after the lapse of the predetermined time period, and thus repeating the interruption and resumption of the power supply.

In the proposed protection system, when the amount of load current exceeds the predetermined reference value, a protective circuit operates so that the engine generator per se, particularly an output-switching circuit (invertor circuit) thereof, etc. can be protected. However, from the viewpoint of protection of the load device, this does not provide proper protection.

For instance, when the output voltage is lowered due to a heavy load applied at the start of an electric motor and the like as the load device, or when the generator cannot generate rated output due to a short-circuit in a portion of the winding thereof, a transient current, which is abnormally too large for the load device, continues to flow until the load device starts to normally operate, over an intolerably long time period, eventually causing failure of the load device.

SUMMARY OF THE INVENTION

It is the object of the invention to provide a power unit which is provided with protective means for properly protecting a load device connected to the power unit as well as the power unit per se.

To attain the above object, the invention provides a power unit including load current-detecting means for constantly detecting an output current supplied from the power unit to a load device connected to the power unit, as a load current, protective means having a first protective function of reducing or cutting off output power supplied from the power unit to the load device when the detected load current exceeds a predetermined current value, and output voltage-detecting means for constantly detecting an output voltage supplied from the power unit to the load device.

The power unit according to the invention is characterized in that the protective means has a second protective function of reducing or cutting off the output power when the detected output voltage has continued to be lower than a predetermined voltage value over a predetermined time period.

Preferably, the protective means comprises a single protective circuit, and the protective circuit comprises input means which is supplied with a first output from the load current-detecting means and a second output from the output voltage-detecting means, a first comparator circuit for determining, based on the first output from the load current-detecting means, whether or not the detected load current exceeds the predetermined current value, and generating a first detection signal when the detected load current exceeds the predetermined current value, a second comparator circuit for determining, based on the second output from the load voltage-detecting means, whether or not the detected output voltage is lower than the predetermined voltage value, and generating a second detection signal when the detected output voltage is lower than the predetermined voltage value, and decision means for generating a stop command signal for inhibiting the power unit from outputting power when at least one of the first and second detection signals has continued to be generated over a predetermined time period.

More preferably, the power unit includes an alternating current generator having an output winding, a rectifier circuit for rectifying an alternating current output from the output winding, driving signal-generating means for generating a driving signal, an invertor circuit for performing switching control of a direct current output from the rectifier circuit in response to the driving signal, and an output circuit for converting an output from the invertor circuit into an alternating current power having a predetermined frequency and supplying the alternating current power to the load device, and the stop command signal is supplied to the driving signal-generating means to cut off supply of the driving signal to the invertor circuit.

Further preferably, the input means of the protective circuit is also supplied with a signal indicative of output voltage from the alternating current generator, and the decision means is responsive to the signal indicative of output voltage from the alternating current generator for not generating the stop command signal before the output voltage from the alternating current generator becomes equal to or higher than a predetermined value.

Preferably, the stop command signal is also supplied to the rectifier circuit to inhibit the rectifier circuit from operating.

The above and other objects, features, and advantages of the invention will become more apparent from the ensuing detailed description taken in conjunction with the accompanying drawings.

BRIEF DESCRIPTION OF THE DRAWINGS

FIGS. 1 to 6 are circuit diagrams showing component parts of an engine generator as a power unit according to an embodiment of the invention, in which:

DETAILED DESCRIPTION

The invention will now be described in detail with reference to the drawings showing an embodiment thereof.

Figures 1, 2:
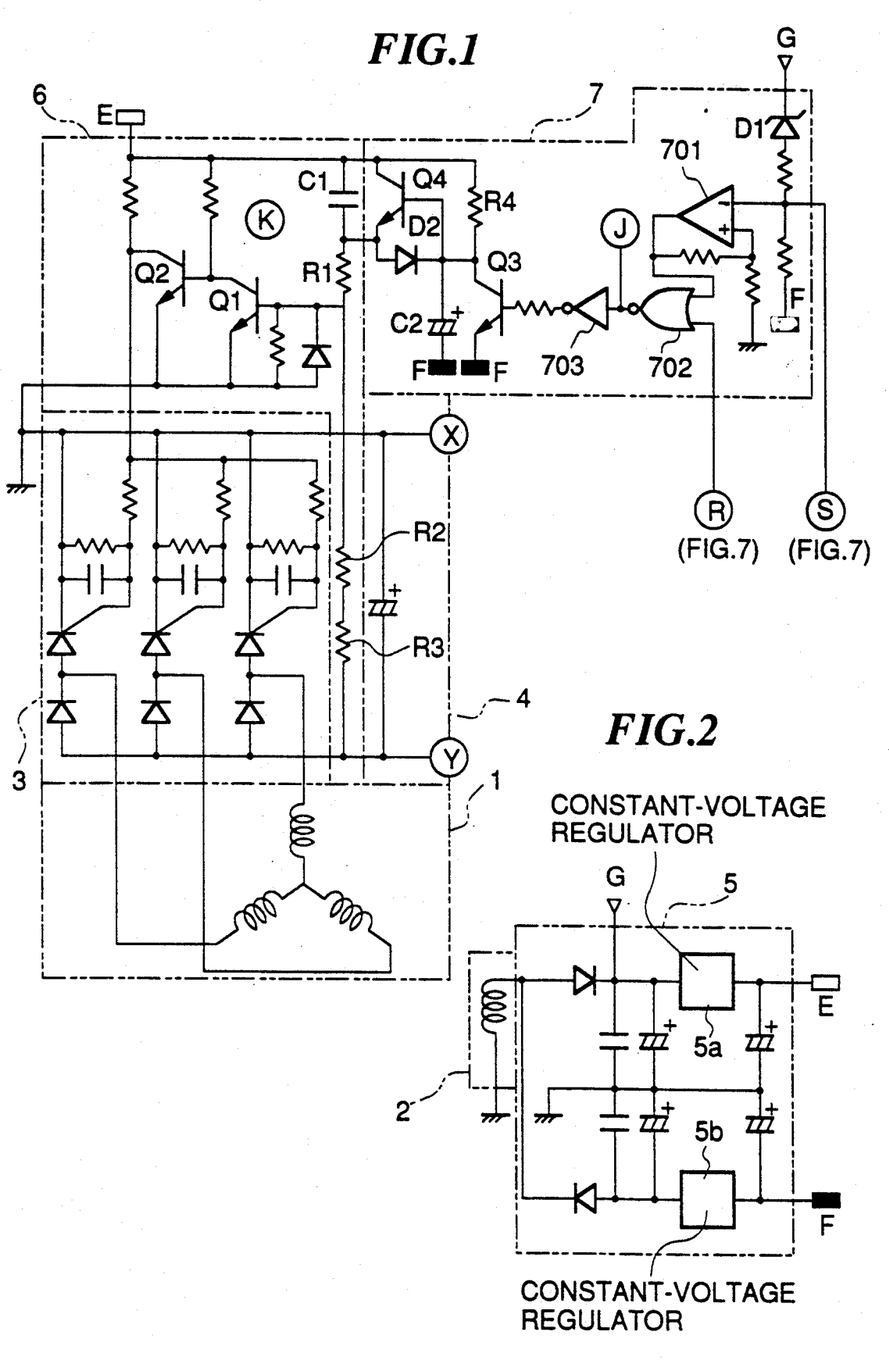
FIG. 1 is a circuit diagram showing a bridge rectifier.
FIG. 2 is a circuit diagram showing a constant-voltage regulator circuit.

FIGS. 1 to 7 show the whole arrangement of an engine generator (power unit) according to an embodiment of the invention. In FIGS. 1 and 2, reference numerals 1 and 2 designate, respectively, a three-phase output winding and a single-phase auxiliary winding wound on a common stator core, not shown, of an AC generator, separately from each other.

A magnet rotor, not shown, having a plurality of magnetic poles is arranged to be rotatively driven by an engine, not shown. The three-phase output winding 1 has its output connected to a bridge rectifier 3 comprised of three thyristors and three diodes, which in turn has its output connected to a smoothing circuit 4.

The single-phase auxiliary winding 2 has its output connected to a constant-voltage regulator circuit 5 having positive and negative output terminals E and F. The constant-voltage regulator circuit 5 has two sets of rectifiers, smoothing circuits, and constant-voltage regulators 5a, 5b, one set being operable in response to current flowing in one direction from the auxiliary winding 2, the other set in response to current flowing in the other direction so that the output terminals E, F supply positive constant voltage and negative constant voltage, respectively.

Reference numeral 6 designates a thyristor control circuit which has a power source-input terminal connected to the positive output terminal E of the constant-voltage regulator circuit 5, and another terminal grounded together with a positive terminal of the smoothing circuit 4. The thyristor control circuit 6 has a signal-input terminal formed of a series circuit of a capacitor C1, and resistances R1 to R3. One end of the series circuit on the capacitor C1 side is connected to the positive output terminal E of the constant-voltage regulator circuit 5, while the other end of the series circuit on the resistance R3 side is connected to a negative terminal of the smoothing circuit 4. The junction between the resistances R1 and R2 is connected to a base of a transistor Q1, which has a collector connected to a base of a transistor Q2. The transistor Q2 in turn has a collector connected to gate input circuits of the thyristors of the bridge rectifier 3. The thyristor control circuit 6, which is arranged as above, controls input signals to the gate input circuits according to a potential at the junction between the resistances R1 and R2 (details of the thyristor control circuit 6 are disclosed in Japanese Provisional Patent Publication (Kokai) No. 3-93499 assigned to the assignee of the present application, and therefore detailed description thereof is omitted here).

The junction K between the capacitor C1 and the resistance R1 is connected to the output of a transient inhibit circuit 7. The transient inhibit circuit 7 has a Zener diode D1, which has a cathode connected to an input terminal G of the constant-voltage regulator 5a provided on the positive output terminal E side of the constant-voltage regulator circuit 5, and an anode connected to the negative output terminal F of the constant-voltage regulator circuit 5 as well as to an inverting input terminal of an inverting comparator 701 formed of an operational amplifier, via resistances. The inverting comparator 701 has a non-inverting input terminal grounded via a resistance. The output of the inverting comparator 701 is connected to one input terminal of a NOR circuit 702, which has the other input terminal R connected to a protective device 8 (shown in FIG. 7) and supplied with a high level signal therefrom when the protective device 8 detects a condition which requires protective operation, such as an overcurrent state of the engine generator. Further, the inverting input terminal S of the inverting comparator 701 is connected to the protective device 8.

Figure 7:
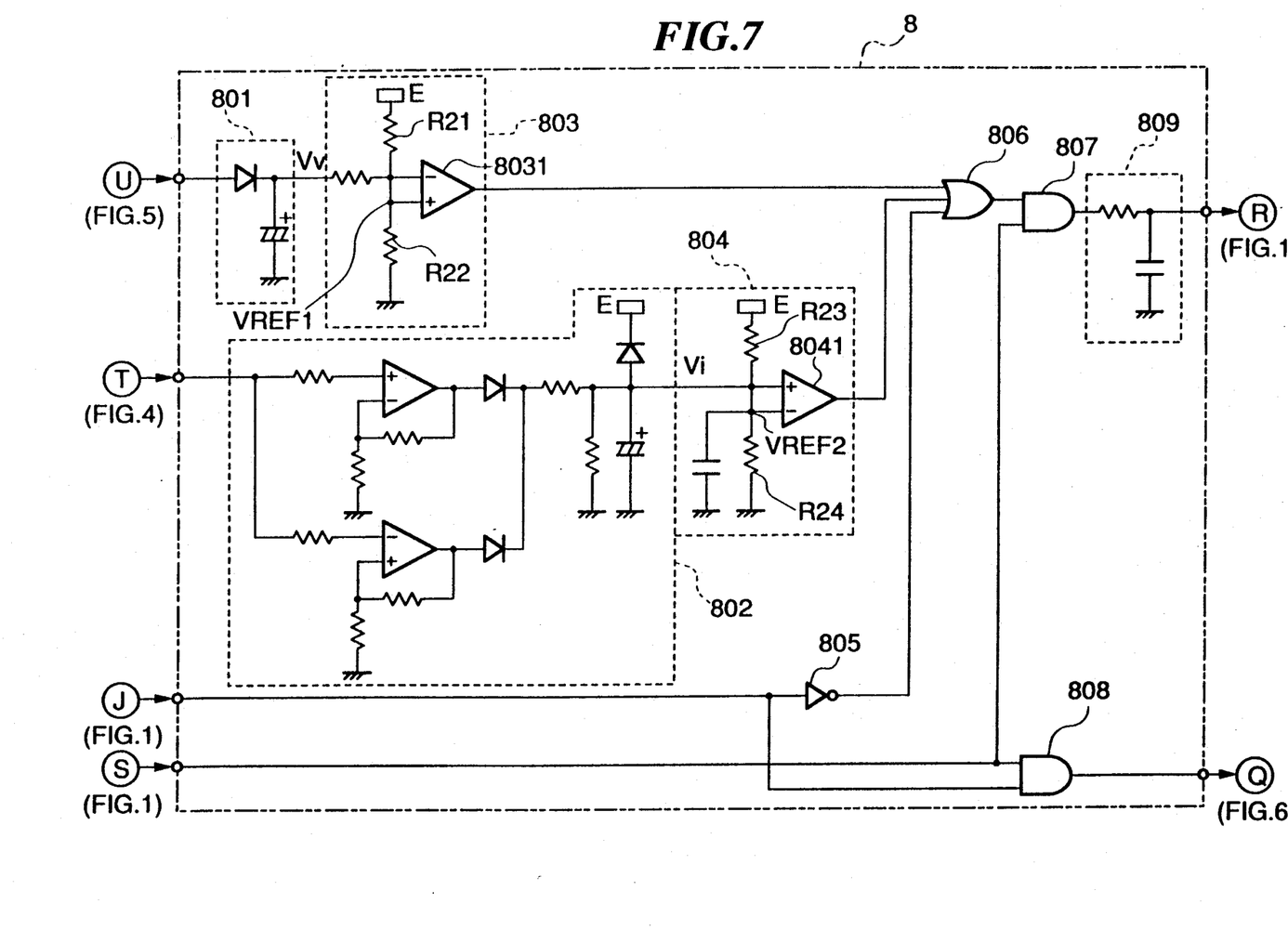
FIG. 7 is a circuit diagram showing a protective device.

The output (J) of the NOR circuit 702 is connected to a base of a transistor Q3 via an invertor 703 and a resistance as well as to the protective device (in FIG. 7). The transistor Q3 has an emitter connected to the negative output terminal F of the constant-voltage regulator circuit 5, and a collector connected to the positive output terminal E of the constant-voltage regulator circuit 5 via a resistance R4 and to the negative output terminal F of the constant-voltage regulator circuit 5 via a capacitor C2. The capacitor C2 has a positive terminal connected to a base of a transistor Q4, which in turn has a collector connected to the positive output terminal E of the constant-voltage regulator circuit 5 and an emitter connected to an anode of a diode D2 and the junction K between the capacitor C1 and the resistance R1 of the thyristor control circuit 6. The diode D2 has a cathode connected to the positive terminal of the capacitor C2.

Figure 3:
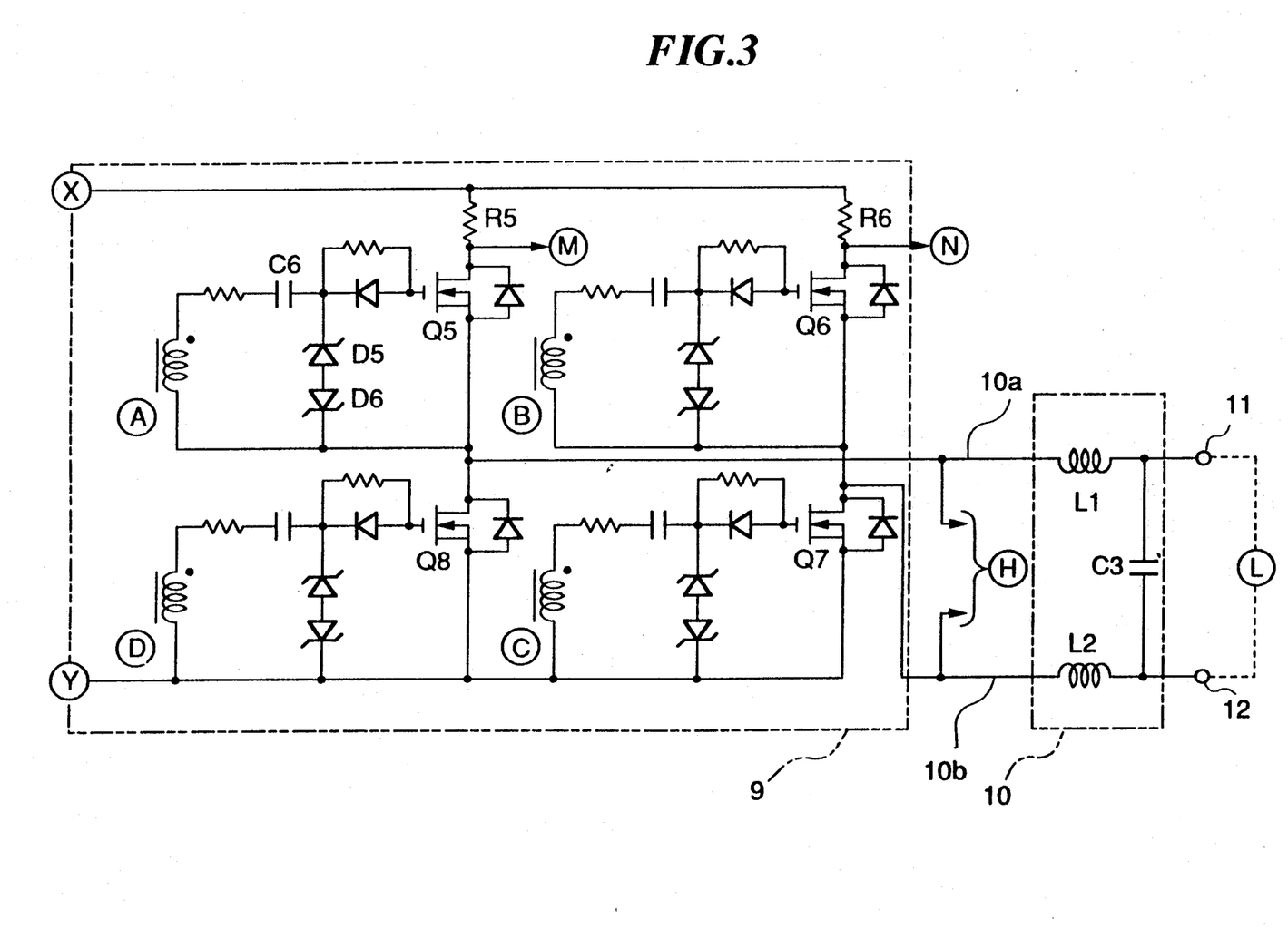
FIG. 3 is a circuit diagram showing a bridge invertor circuit.

The smoothing circuit 4 has its output connected to a bridge invertor circuit 9 shown in FIG. 3. The invertor circuit 9 is formed by a bridge circuit composed of four FET's (field effect transistors) Q5-Q8 as switching elements which have their gates connected to FET gate-driving signal circuits 24, 25, hereinafter referred to. The invertor circuit 9 has current-detecting resistances R5, R6 connected between drains of the FET's Q5 and Q6 and a grounded common line for detecting load current.

The output of the bridge invertor circuit 9 is connected via output lines 10a, 10b and an output circuit 10 to output terminals 11 and 12 which are connected to a load device (hereinafter referred to as "the load") (L). The output circuit 10 comprises a low-pass filter formed of coils L1 and L2 connected in series to the load, and a capacitor C3 connected in parallel with the load.

Figure 5:
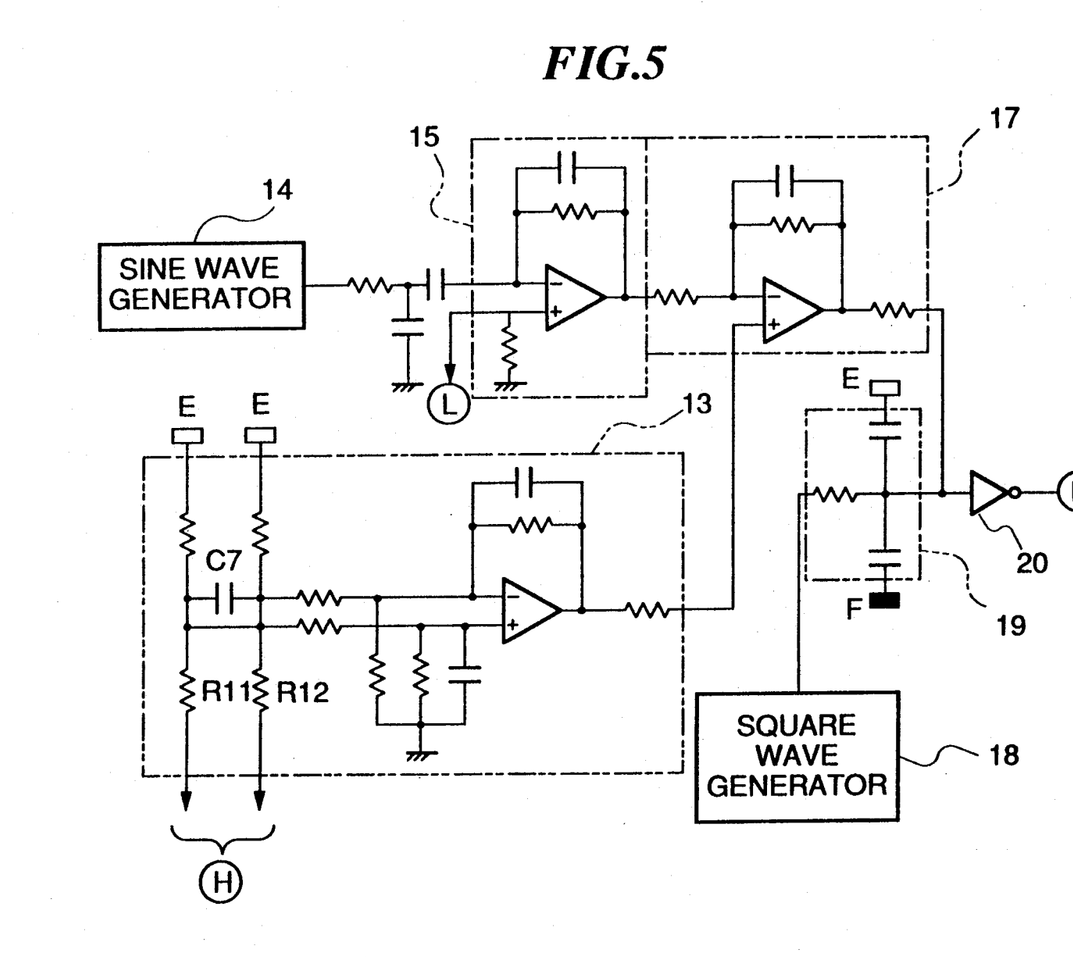
FIG. 5 is a circuit diagram showing a pulse width modulating circuit.

The output lines 10a, 10b are connected to a detecting circuit 13 formed of dividing resistances, a differential amplifier, etc., shown in FIG. 5. The detecting circuit 13 directly compares between voltages appearing on the output lines 10a and 10b to thereby detect distortions in the waveform of the engine generator output voltage and an offset component thereof and outputs a signal indicative of the results of the comparison. The output (U) from the detecting circuit 13 is connected to a non-inverting input terminal of a differential amplifier 17 as well as to the protective device 8.

Reference numeral 14 designates a sine wave generator (sine wave-forming circuit) which generates a sine wave signal having a commercial frequency, e.g. 50 Hz or 60 Hz. The output of the sine wave generator 14 is connected to an inverting input terminal of a differential amplifier 15, whose non-inverting input terminal is connected to the output of a peak-detecting circuit 16 shown in FIG. 4, which forms a correcting circuit together with the differential amplifier 15. The peak detecting circuit 16 is composed of high-speed operational amplifiers arranged in four stages. The gain of each operational amplifier is set to a value of approx. 10 times to thereby obtain a high slew rate. Since the high-gain operational amplifiers and the differential amplifier 15 are arranged in five stages, a high total gain is obtained.

Figure 4:
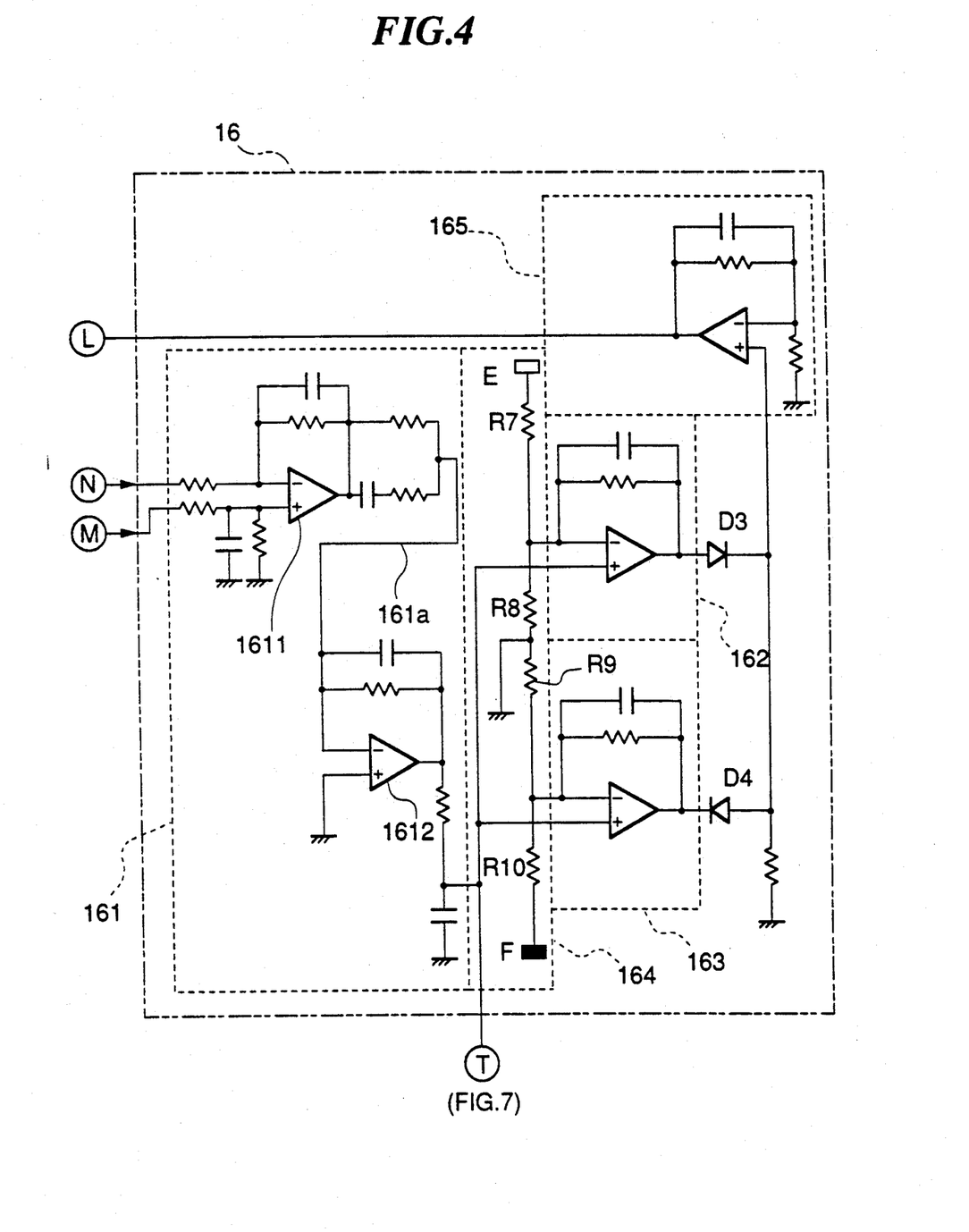
FIG. 4 is a circuit diagram showing a peak-detecting circuit.

The peak-detecting circuit 16 shown in FIG. 4 has the following arrangement: The junctions M, N of the current-detecting resistances R5, R6 with the FET's Q5 and Q6 of the bridge invertor circuit 9 are connected to a non-inverting input terminal and an inverting input terminal of an input side amplifier 1611 of a double-staged amplifier 161, and the output of the amplifier 1611 is connected via an output line 161a to an output side amplifier 1612 of the double-staged amplifier 161. The output of the amplifier 1612 is connected to non-inverting input terminals of an offset amplifier 162 and an offset amplifier 163.

Reference numeral 164 in FIG. 4 designates an upper and lower limit-setting circuit formed of a series circuit of resistances R7 to R10. One end of the series circuit is connected to the positive output terminal E of the constant-voltage regulator circuit 5 and the other end of same is connected to the negative output terminal F of the constant voltage regulator circuit 5. The junction between the resistances R8 and R9 is grounded. The upper and lower limit-setting circuit 164 supplies a predetermined upper limit voltage to an inverting input terminal of an operational amplifier forming part of the offset amplifier 162, and a predetermined lower limit voltage to an inverting input terminal of an operational amplifier forming part of the offset amplifier 163.

The output of the offset amplifier 162 is connected to an anode of a diode D3, while the output of the offset amplifier 163 is connected to a cathode of a diode D4. A cathode of the diode D3 and an anode of the diode D4 are connected to a non-inverting input terminal of an operational amplifier forming part of a non-inverting amplifier 165, and grounded via a resistance. The output L of the non-inverting amplifier 165 is connected to the non-inverting input terminal of the operational amplifier of the differential amplifier 165 in FIG. 5, and grounded via a resistance. Further, the output T of the double-staged amplifier 161 is connected to the protective circuit 8 in FIG. 7.

The differential amplifier 15 corrects a sine wave reference signal generated from the sine wave generator 14 by a feedback signal dependent on an output current (load current) appearing on the output lines 10a, 10b, as described in detail hereinafter.

The output of the differential amplifier 15 is connected to an inverting input terminal of an operational amplifier forming part of a differential amplifier 17, while the output of the detecting circuit 13 is connected to a non-inverting input terminal of the operational amplifier of the differential amplifier 17. The differential amplifier 17 corrects the level of the sine wave reference signal supplied from the sine wave generator 14 by the signal supplied from the detecting circuit 13, and outputs a corrected sine wave reference signal.

Reference numeral 18 designates a square wave generator which generates a square wave signal having a frequency by far higher than the frequency of the sine wave reference signal generated by the sine wave generator 14. The output of the square wave generator 18 is connected to an integrating circuit 19, which integrates the square wave signal into a triangular wave signal.

The corrected sine wave signal from the differential amplifier 17 and the triangular wave signal from the integrating circuit 19 are superposed upon each other and the superposed signal is then supplied to an invertor buffer (pulse width modulating circuit) 20. The invertor buffer 20 is formed by an amplifier with a predetermined fixed threshold level which operates such that when a signal having a level exceeding the threshold level is inputted, it outputs an amplified low level signal, while when a signal having a level below the threshold value is inputted, it outputs an amplified high level signal, thus forming a pulse width modulated (PWM) signal. The invertor buffer 106 may be formed by an IC having a fixed threshold level relative to its gate input level, e.g. a threshold level of a CMOS gate on the input terminal side.

Figure 6:
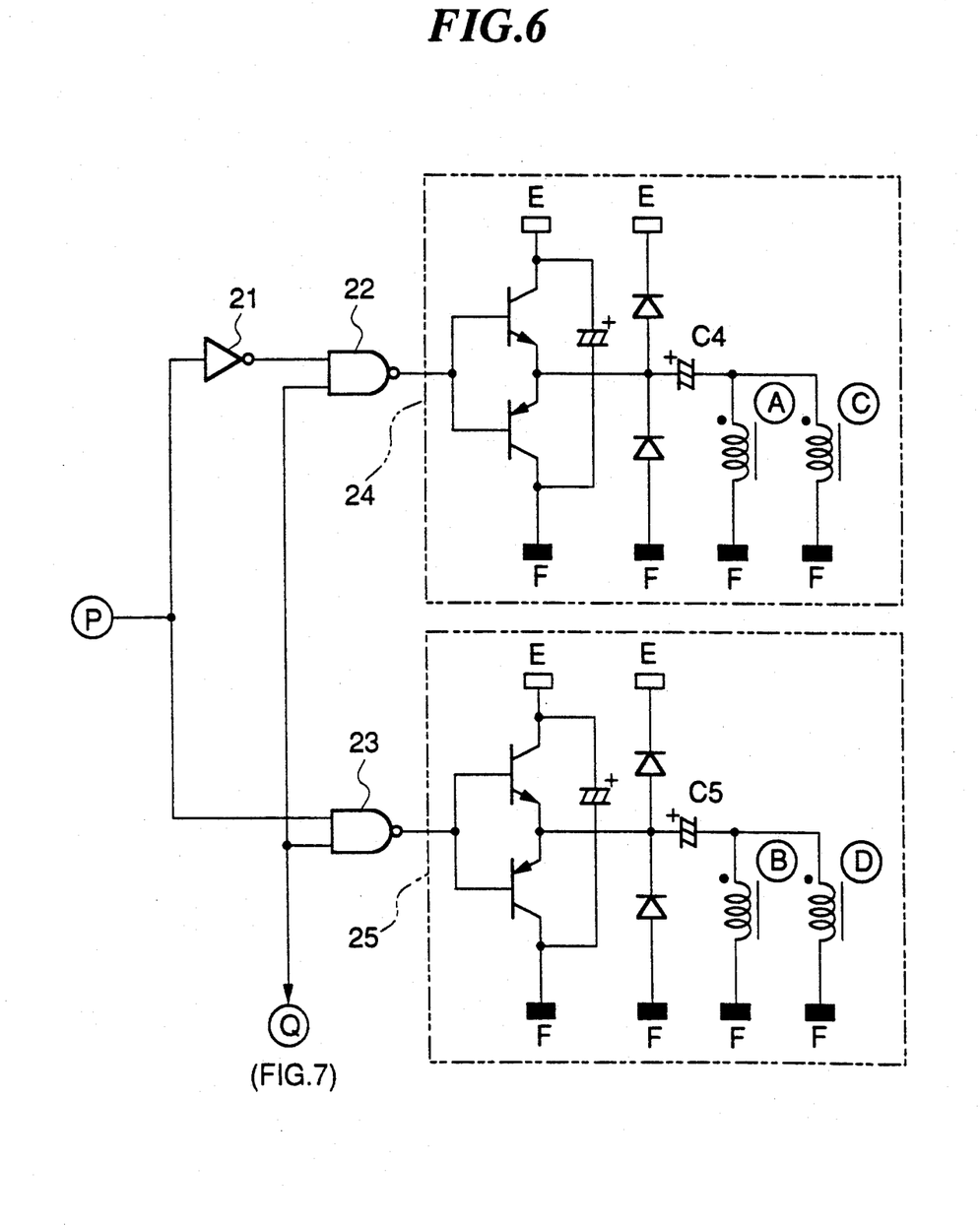
FIG. 6 is a circuit diagram showing FET gate-driving signal circuits.

The output P of the invertor buffer 20 is connected via an invertor 21 to an input terminal of a NAND circuit 22, and directly connected to an input terminal of a NAND circuit 23, as shown in FIG. 6. The other input terminals of the NAND circuits 22, 23 are connected to the output Q of the protective device 8 (in FIG. 7).

The outputs of the NAND circuits 22, 23 in FIG. 6 are connected to the FET gate-driving signal circuits 24, 25. The FET gate-driving signal circuit 24 is composed of a push-pull amplifier, diodes for absorbing surge, a capacitor C4 for eliminating low frequency components, and primary coils of pulse transformers A, C. Similarly, the gate-driving signal circuit 25 is composed of a push-pull amplifier, diodes for absorbing surge, a capacitor C5 for eliminating low frequency components, and primary coils of pulse transformers B, D.

The secondary coil of the pulse transformer A (appearing in the bridge invertor circuit 9 in FIG. 3) is connected to a gate of the FET Q5 via a damping resistance, a capacitor C6 for reproducing the pulse width modulated signal before passing the capacitor C4 in the FET gate-driving signal circuit 24, and a two-way voltage limitter formed of diodes D5, D6. The secondary coils of the pulse transformers B, C, D are connected to gates of the FET's Q6, Q7, Q8, respectively, via circuits each of which is identical to that described in relation to the secondary coil of the pulse transformer A (the FET gate-driving signal circuits 24, 25, pulse transformers, damping resistances, capacitors for reproducing the PWM signal, two-way voltage limitter, etc. form a switching control circuit).

The protective device 8 in FIG. 7 is comprised of first and second rectifying/smoothing circuits 801, 802, and first and second comparator circuits 803, 804, an invertor 805, an OR circuit 806, first and second AND circuits 807, 808, and an integrating circuit 809.

The first rectifying/smoothing circuit 801 has an input thereof connected to the output U of the detecting circuit 13 in FIG. 5 and supplied with a signal having amplitude corresponding to the output voltage from the power unit. The output of the first rectifying/smoothing circuit 801 is connected via a resistance to an inverting input terminal of a comparator 8031, which has a non-inverting input terminal connected to a junction between serially connected resistances R21, R21, the resistance R21 having an end thereof connected to the positive output terminal of the constant-voltage regulator circuit 5, and the resistance R22 having an end thereof grounded. The output of the first comparator 803 is connected to a first input terminal of the OR circuit 806. The second smoothing/rectifying circuit 802 has an input thereof connected to the output T of the double-staged amplifier 161 in FIG. 4 and supplied with a signal having amplitude corresponding to the output current from the power unit. The output of the second smoothing/rectifying circuit 802 is connected to a non-inverting input terminal of a comparator 8041, which has an inverting input terminal connected to a junction between serially connected resistances R23, R24, the resistance R23 having an end thereof connected to the positive output terminal E of the constant-voltage regulator circuit 5, and the resistance R24 having an end thereof grounded, with a capacitor connected in parallel therewith. The output of the second comparator 804 is connected to a second input terminal of the OR circuit 806.

The input of the invertor 805 and one input terminal of the AND circuit 808 are connected to the output J of the NOR circuit 702 in FIG. 1. One input terminal of the first AND circuit 807 and another input terminal of the second AND circuit 808 are connected to the inverting input terminal S of the inverting amplifier 701. The output of the invertor 805 is connected to a third input terminal of the OR circuit 806, and the output of the OR circuit 806 is connected to another input terminal of the first AND circuit 807. The output of the first AND circuit 807 is connected to another input terminal R of the NOR circuit 702 in FIG. 1, while the output of the AND circuit 808 is connected to input terminals Q of the AND circuits 22, 23 in FIG. 6.

The operation of the engine generator constructed as above will now be described.

As the engine generator is driven by the engine, the three-phase output winding 1 generates three-phase AC power which is rectified by the bridge rectifier 3, and then smoothed into DC power by the smoothing circuit 4, while variation in the DC voltage in the smoothing circuit 4 is detected via the resistances R2, R3 by the thyristor control circuit 6, which supplies a signal indicative of the results of the detection to the thyristors of the bridge rectifier 3 to thereby effect on/off control of the thyristors in a feedback manner, such that the output voltage from the smoothing circuit 4 is stably kept at a predetermined DC voltage. In this connection, the thyristor control circuit 6 is also supplied with an output signal from the transient inhibit circuit 7. The operation of the thyristor control circuit 6 and the bridge rectifier 3 responsive to the output signal will be described later.

The FET's Q5, Q7 and FET's Q6, Q8 of the bridge invertor circuit 9 have their gates supplied with the pulse width-modulated (PWM) signal so that the FET's Q5, Q7 are caused to conduct alternately, and so do the FET's Q6, Q8 to effect switching control of the DC output from the smoothing circuit 4. The switch-controlled output is supplied to the output circuit 10 where high frequency components thereof are removed. The output from the output circuit 10 is supplied through the output terminals 11, 12 to the load as commercial frequency AC power.

The output voltage appearing at the output line 10a and the output voltage appearing at the output line 10b are supplied to the detecting circuit 13, where they have their high frequency components removed therefrom by a filter circuit composed of resistances R11, R12 and the capacitor C7, and have their commercial frequency components compared with each other and amplified, to be converted into an output voltage detection signal containing distortions in the waveform of the engine generator output voltage or offset components of same, which is supplied to the differential amplifier 17 and the protective device 8.

The sine wave reference signal having the commercial frequency, which is generated by the sine wave generator 14, is corrected with respect to its peak value according to the AC output current by the operation of the differential amplifier 15, described in detail later, and then supplied to the differential amplifier 17.

The differential amplifier 17 compares the corrected sine wave signal from the differential amplifier 15 with the feedback signal from the detecting circuit 13 containing distortions in the waveform of the output voltage and DC offset components of same, and corrects the level of the former by the latter, to output a twice-corrected sine wave signal.

The square wave signal from the square wave generator 18 is integrated by the integrating circuit 19 into the triangular wave signal. This triangular wave signal is superposed upon the corrected sine wave signal from the differential amplifier 17 into a superposed signal, which is supplied to the invertor buffer 20. The invertor buffer 20 operates to generate a low level output when supplied with an input having a level exceeding its threshold level, and generate a high level output when supplied with an input having a level below the threshold level. The resulting pulse train signal outputted from the invertor buffer 20 is the pulse width-modulated (PWM) signal obtained by pulse width modulating the corrected sine wave signal by the triangular signal as the carrier wave. Since the PWM signal is created by the use of the corrected sine wave signal, the AC output current is corrected with respect to its peak value (which will be described hereinafter) and also the AC output voltage can be corrected such that distortions in the waveform thereof and offset components thereof are reduced. Further, the use of the invertor buffer having a response time (approx. 50 nsec.) by far shorter than that (approx. 1 μsec.) of a comparator used in conventional PWM type invertor devices affords increasing the frequency of a carrier wave used for forming the PWM signal, which enables to supply AC power having high quality which has an output waveform closer to the waveform of a sine wave.

The PWM signal from the invertor buffer 20 is, on one hand, inverted by the invertor 21 and then supplied to the NAND circuit 22, while on the other hand it is directly supplied to the NAND circuit 23. The NAND circuits 22, 23 are supplied with a low level signal from the protective device 8, when a state of the engine generator necessitating the circuit protection, such as an overcurrent state of same, is detected, or a low engine rotational speed is detected, when the engine is started or on other occasions. When supplied with the low level signal, the NAND circuits 22, 23 continue to output high level signals irrespective of the level of the PWM signal, thus the PWM signal being prevented from being transmitted to the bridge invertor circuit 9. When neither a state of the engine generator necessitating the circuit protection nor a low engine rotational speed is detected, the NAND circuits 22, 23 are supplied with a high level signal from the protective device 8. When supplied with the high level signal, the NAND circuits 22, 23 are responsive to inverted and non-inverted PWM signals supplied thereto to output signals obtained by inverting the inverted and non-inverted PWM signals, respectively. Accordingly, the FET gate-driving signal circuit 24 is supplied with the non-inverted PWM signal, while the FET gate-driving signal circuit 25 is supplied with the inverted PWM signal.

In the FET gate-driving signal circuit 24, the PWM signal is subjected to push-pull amplification, and has its low frequency components, i.e. commercial frequency components, cut off by the capacitor C4. Before passing the capacitor C4, the PWM signal has constant amplitude with respect to the reference level but the average voltage (integrated value) of this signal varies with the same period as the sine wave signal from the sine wave generator 14. Therefore, this PWM signal contains a component of the same frequency as that of the sine wave signal (commercial frequency). The PWM signal is converted by the capacitor C4 into a pulse train which varies as a whole in reverse phase to the commercial frequency component and always has a zero average voltage.

This pulse train always having a zero average voltage is applied to the primary coils of the pulse transformers A, C. Therefore, cores of the pulse transformers A, C are hardly magnetically saturated due to the commercial frequency component, making it possible to use small-sized transformers A, C without the fear of being magnetically saturated at the PWM carrier frequency.

The FET gate-driving signal circuit 25 operates just similarly to the FET gate-driving circuit 24.

An output pulse signal from the secondary coil of the pulse transformer A is compared with the breakdown voltage of each of the Zener diodes D5, D6 forming the two-way voltage limitter. The capacitor C6 is charged or discharged by voltage portions of the pulse signal exceeding the corresponding breakdown voltages, so that a voltage occurs across the capacitor C6, which is an average voltage of the amounts by which the output pulse signal exceeds the breakdown voltages of the Zener diodes D5, D6, the average voltage having the commercial frequency. Therefore, a signal which is obtained by superposition of the terminal voltage of the capacitor C6 having the commercial frequency and the output pulse signal from the secondary coil of the pulse transformer A, i.e. the PWM signal before passing the capacitor C4, is reproduced between the gate and source of the FET Q5. The FET Q5 conducts while each positive pulse of the PWM signal is applied to its gate.

An output pulse signal from the secondary coil of the pulse transformer C is also processed in the same manner as the output pulse signal from the pulse transformer A. Thus, the FET's Q5 and Q7 conduct simultaneously.

Output pulse signals from the secondary coils of the pulse transformers B, D are processed in the same manner as the output pulse signals from the secondary coils of the pulse transformers A, C. However, since the PWM signal supplied to the pulse transformers A, C and the PWM signal supplied to the pulse transformers B, D are reverse in phase to each other, the FET's Q6, Q8 do not conduct when the FET's Q5, Q7 conduct, and the FET's Q5, Q7 do not conduct when the FET's Q6, Q8 conduct.

As described above, the bridge invertor circuit 9 carries out switching control based upon a PWM signal which is formed by modulating by a high frequency triangular wave signal a sine wave signal having a commercial frequency which is corrected in a feedback manner based on the output waveform, and then a carrier frequency component contained in the switched output from the invertor circuit 9 is removed by the output circuit 10, whereby alternating current output having the commercial frequency, which is close in waveform to the sine wave signal is supplied through the output terminals 11, 12 to the load.

For further details of the construction and operation of the circuit arrangement of the bridge invertor circuit 9 and the detecting circuit 13 through the FET gate-driving signal circuit 25 (except the differential amplifier 15 and the peak detecting circuit 16), reference should be made to U.S. Ser. No. 07/790,470 assigned to the present assignee.

Next, the operation of the transient inhibit circuit 7 will be described.

Immediately after the engine is started, the output voltage of the AC generator is low, so that the voltage at the input terminal of the constant-voltage regulator 5a forming part of the constant-voltage regulator circuit 5 is low. Therefore, at the start of the engine, the voltage at the input terminal of the constant-voltage regulator 5a does not exceed the breakdown voltage of the Zener diode D1 (voltage corresponding to a predetermined engine rotational speed which is lower than the engine rotational speed to be assumed during normal operation of the engine generator), which prevents the Zener diode D1 from conducting. Accordingly, the inverting input terminal of the inverting comparator 701 remains at a low level, and therefore the inverting comparator 701 outputs a high level signal.

Since the NOR circuit 702 outputs a low level signal when it is supplied with a high level signal via at least one of its input terminals, the output from the NOR circuit 702 is low either when the inverting comparator 701 outputs a high level signal or when the protective device 8 outputs a high level signal.

The low level signal from the NOR circuit 702 is inverted by the invertor 703 into a high level signal, which causes the transistor Q3 to conduct, thereby allowing the capacitor C2 to be discharged. Accordingly, the transistor Q4 does not conduct, which results in a low level of potential at the junction K between the capacitor C1 and the resistance R1.

As a result, the transistor Q1 of the thyristor control circuit 6 remains off to cause the transistor Q2 to conduct, so that the gates of the thyristors of the bridge rectifier 3 are supplied with a low level signal. This prevents the thyristors from conducting and hence the bridge rectifier 3 does not supply a rectified output. In short, when the engine rotational speed is lower than a predetermined value, or when a state of the engine generator necessitating the circuit protection is detected, the bridge rectifier 3 is inhibited from supplying the rectified output, whereby an unstable operation of the invertor device at the start of the engine as well as the power supply in a state of the engine generator necessitating the circuit protection is prevented.

Then, the output voltage from the AC generator gradually increases after the start of the engine. When the voltage at the input terminal of the constant-voltage regulator 5a rises to a level exceeding the breakdown voltage of the Zener diode D1, that is, when the engine rotational speed exceeds the predetermined value, the Zener diode D1 conducts to convert the voltage supplied to the inverting input terminal of the inverting comparator 701 into a high level, and hence the inverting comparator 701 outputs a low level signal.

At this time, if a state necessitating the circuit protection is not detected, the output from the NOR circuit 702 goes high, and hence the output from the invertor 703 goes low. Accordingly, the transistor Q3 turns off to cause the capacitor C2 to be charged by way of the resistance R4. As the capacitor C2 is thus charged, the potential at the positive terminal of the capacitor C2 gradually rises in accordance with a time constant determined by the capacity of the capacitor C2 and the resistance value of the resistance R4. Responsive to a rise in the potential at the positive terminal of the capacitor C2, the transistor Q4 conducts, which causes a potential at the emitter of the transistor Q4 to rise. However, if the potential at the emitter of the transistor Q4 becomes higher than a potential at the base of the transistor Q4, the transistor Q4 turns off. As a result, the potential at the junction K between the capacitor C1 and the resistance R1 is constantly held at a value slightly lower than the potential at the positive terminal of the capacitor C2. Therefore, the potential at the junction K gradually rises in accordance with the time constant determined by the capacity of the capacitor C2 and the resistance value of the resistance R4, after the engine rotational speed has exceeded the predetermined value.

Accordingly, the thyristor control voltage (between X and Y), which is proportional to the potential at the junction K, gradually rises. Finally, the potential at the junction K substantially reaches the positive output potential of the constant-voltage regulator circuit 5, and the gate voltage at the thyristors reaches a predetermined input value for feedback control carried out for maintaining a potential at the junction between the resistances R1 and R2 at a predetermined level.

Thus, even if the engine is started in a state where the output terminals 11, 12 are connected to a load, it is possible to prevent electric current from rushing into the thyristors of the bridge rectifier 3 when the engine generator is in an unstable state in which the output voltage of the AC generator is not sufficiently high. This in turn prevents application of a drastically-changing voltage to the FET's of the bridge invertor circuit 9 when the engine generator is in an unstable state. The effects of this preventive operation are greater as the load connected to the output terminals 11, 12 at the start of the engine is heavier. Particularly when the load is short-circuited, adverse effects on the thyristors and the FET's are very effectively prevented.

Next, the operation of the peak detecting circuit 16 and the differential amplifier 15 forming the correcting circuit will be described.

Figure 8:
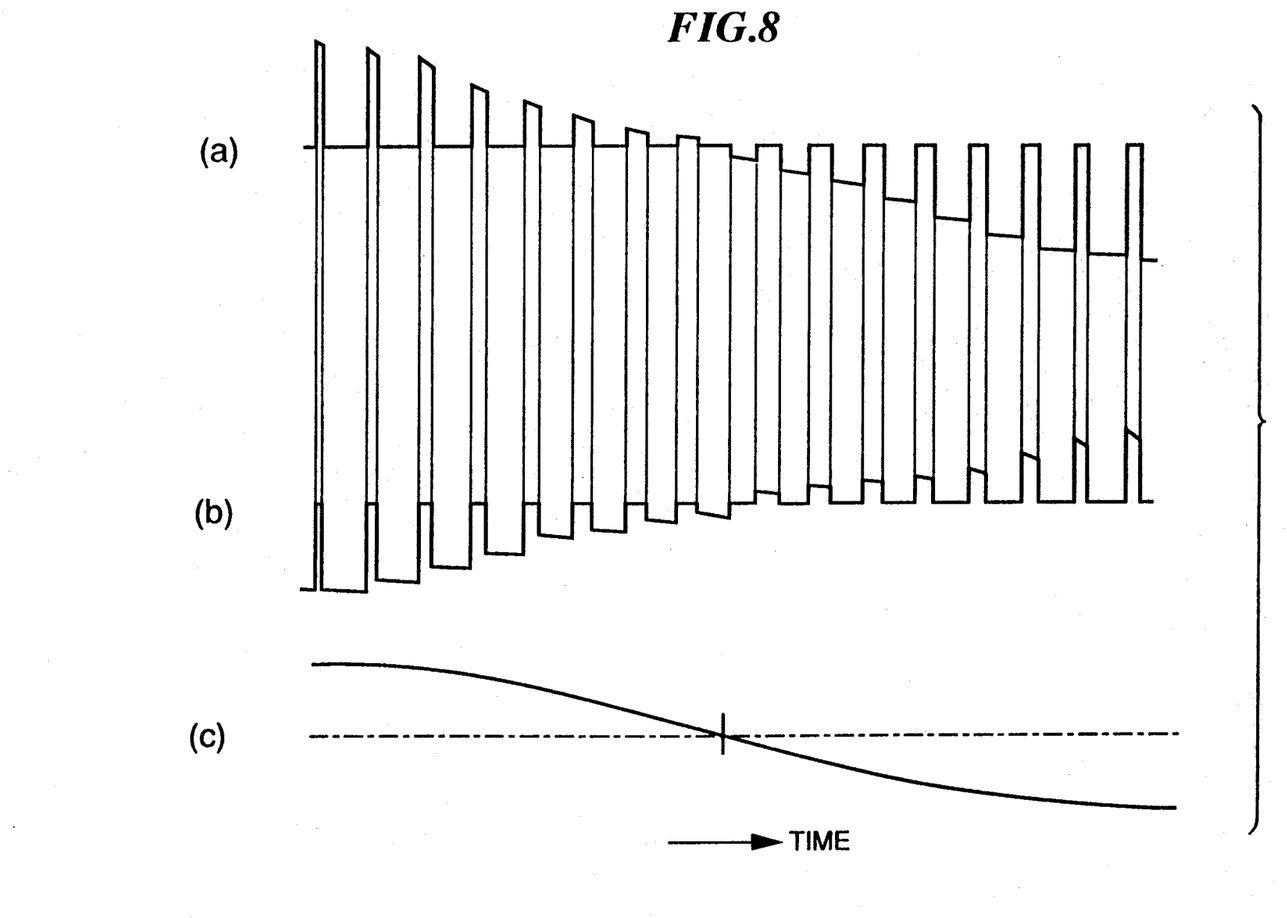
FIG. 8 is a timing chart showing signals appearing at points in the peak-detecting circuit.

Across the current-detecting resistances R5, R6 in the bridge invertor circuit 9, there occur voltages depending on the output current (load current) from the bridge invertor circuit 9. FIG. 8 (a) shows a waveform of current detected at the junction M. A waveform of current detected at the junction N is reverse in phase to the waveform of current detected at the junction M, as shown in FIG. 8 (b). Signals indicative of currents detected at the junctions M, N (output current signals) are supplied to the non-inverting input terminal and inverting input terminal of the operational amplifier 1611 of the peak detecting circuit 16. The operational amplifier 1611 forms an integrating circuit, where the signals indicative of currents detected at the junctions M, N have their high frequency components removed therefrom. When attention is paid to the signal indicative of a current detected at the junction M alone, a signal containing the DC component and commercial frequency component appears at the output of the operational amplifier 1611. This signal is inversely amplified by the operational amplifier 1612 forming an integrating circuit into a commercial frequency signal having high frequency components removed therefrom as shown in FIG. 8 (c), which is supplied to the offset amplifiers 162, 163 as well as to the protective device 8.

The offset amplifier 162 compares the amplitude of the commercial frequency signal supplied to the non-inverting input terminal of the operational amplifier thereof with the predetermined upper limit voltage supplied from the upper and lower limit-setting circuit 164 to the inverting input terminal of same, and amplifies only a portion (a peak portion in a positive half-cycle) of the voltage of the commercial frequency signal exceeding the predetermined upper limit voltage as a threshold value for determining an excessive peak current (so-called "offset amplification"). The offset amplifier 163 compares the amplitude of the commercial frequency signal supplied to the non-inverting input terminal of the operational amplifier thereof with the predetermined lower limit voltage supplied from the upper and lower limit-setting circuit 164 to the inverting input terminal of same, and amplifies only a portion (a peak portion in a negative half-cycle) of the voltage of the commercial frequency signal lower than the predetermined lower limit voltage as a threshold value for determining an excessive peak current (so-called "offset amplification"). The outputs from the offset amplifiers 162, 163 pass the diodes D3, D4, respectively, and are then superposed on each other. The superposed signal is a composite signal of a voltage portion of the amplified commercial frequency signal which is higher in voltage than the predetermined upper limit voltage and a voltage portion of the amplified commercial frequency signal which is lower in voltage than the predetermined lower limit voltage. When the amplified commercial frequency signal is neither higher than the upper limit voltage nor lower than the lower limit voltage, the composite signal is held at a zero level.

The composite signal is amplified by the non-inverting amplifier 165, and then supplied to the non-inverting input terminal of the operational amplifier of the differential amplifier 15. The differential amplifier 15 compares the composite signal with the sine wave signal from the sine wave generator 14, and performs differential amplification, i.e. amplifies the difference between the two signals. More specifically, when the AC output current becomes so large that the level of a peak portion in a positive or negative half-cycle of the commercial frequency signal falls above or below the predetermined upper or lower limit voltage, i.e. portions of the waveform of the AC output current falls outside the range determined by the predetermined upper and lower limits of amplitude, the sine wave signal is corrected in a feedback manner responsive to the amount of the peak portion above or below the predetermined upper or lower limit such that the peak portion of the sine wave signal is made flat. The sine wave signal which is thus corrected with respect to its peak portions is then supplied to the differential amplifier 17.

As a result, the AC output current obtained by pulse width modulation based on the corrected sine wave signal has a waveform having peak portions made flat. That is, its peak current value is thus limited. In this connection, it should be noted that when overcurrent flows, only the peak current value is delimited, but the supply of the AC output current per se is not cut off, which enables to continue the supply of the AC output power to a load which would cause a temporary excessive rise in the peak current, without any difficulty.

The AC output current is thus detected, so that as shown in FIG. 8 (b) and (c), even when the engine generator is connected to a special load, such as a half-wave rectification load, the DC component is not lost. Therefore, it is possible to accurately detect a peak current value and hence properly suppress overcurrent.

Next, the operation of the protective device 8 in FIG. 7 will be described.

Responsive to the signal having amplitude corresponding to the output voltage from the power unit supplied from the detecting circuit 13, the first rectifying/smoothing circuit 801 outputs a DC voltage Vv corresponding to an effective value of the output voltage. The voltage Vv is compared at the first comparator circuit 803 with a reference voltage VREF1 determined by the resistances R21, R22. If Vv>VREF1, the output from the first comparator circuit 803 goes low, whereas if Vv<VREF1, it goes high. In other words, the output from the first comparator circuit 803 goes high when the output voltage from the power unit becomes lower than a predetermined value corresponding to VREF1.

On the other hand, responsive to the signal having amplitude corresponding to the output current from the power unit supplied from the double-staged amplifier 161 of the peak-detecting circuit 16 (see FIG. 8 (c), the second rectifying/smoothing circuit 804 outputs a DC voltage Vi corresponding to an effective value of the output current. The DC voltage Vi is compared at the second comparator circuit 804 with a reference voltage VREF2 determined by resistances R23, R24. If Vi>VREF2, the output from the second comparator circuit 804 goes high, whereas if Vi<VREF2, it goes low. In other words, the output from the second comparator circuit 804 goes high when the output current from the power unit becomes larger than a predetermined value corresponding to VREF2.

If at least one of the outputs from the first and second comparator circuits goes high, i.e. if the power unit output voltage becomes lower than the predetermined value and/or the power unit output current becomes higher than the predetermined value, the output from the OR circuit 806 goes high. If the input to the other input terminal of the first AND circuit 807 is then at a high level (it is at a high level except when the engine has just been started, as hereinafter described), the output from the first AND circuit 807 also goes high. As a result, the output from the integrating circuit 809 goes high after the lapse of a predetermined time period determined by a time constant of this circuit (i.e. the output exceeds a threshold level of the NOR circuit 702). Therefore, the output from the integrating circuit 809 does not go high if the output from the AND circuit 807 goes low before the predetermined time period elapses. If the output from the integrating circuit 809 goes high, the output from the NOR circuit 702 in FIG. 1 goes low, so that the transient inhibit circuit 7 operates to inhibit the bridge rectifier 3 from operating.

Since the output (J) from the NOR circuit 702 is also supplied to the invertor 805 and the second AND circuit 808 of the protective device 8, if the potential at the point J goes low, the output from the AND circuit 808 goes low. As a result, the outputs from the NAND circuits 22, 23 in FIG. 6 are held at a high level to inhibit the transfer of the PWM signal therefrom. Further, the output from the invertor 805 goes high, and hence the output from the OR circuit 806 is held at a high level irrespective of whether the outputs from the first and second comparator circuits are high or low. Accordingly, once the protective device has started its protecting operation, the power unit continues to be in this protected state, irrespective of the values of output voltage and output current.

The other input terminals of the first and second AND circuits 807, 808 are supplied with the same voltage as the input voltage of the inverting input terminal of the inverting comparator 701, so that when the output voltage from the AC generator is low immediately after the start of the engine, the outputs from the AND circuits 807, 808 are held at a low level. Accordingly, the first AND circuit 807 acts to inhibit the protective device 8 from operating even if the output voltage from the power unit is below a predetermined value (i.e. the output from the first comparator 803 is at a high level), and at the same time the second AND circuit 808 acts to inhibit the invertor circuit 9 from operating immediately after the start of the engine.

As describe heretofore, the protective device 8 operates, not only when the power unit output current becomes too large (i.e. exceeds a predetermined value), but also when the output voltage has been lower than a predetermined value over a predetermined time period determined by the time constant of the integrating circuit 809, to thereby inhibit the power unit from supplying output power to the load device. This takes into consideration the following cases: If load devices take much time before they start to normally operate due to low output voltage from the power unit caused by insufficient power generated by the power unit per se, or if a component part of the power unit is defective to lower the voltage applied to the load device, the load device continues to be in a transient state before the start thereof in which a large current in excess of the rated current of the power unit continues to be supplied thereto, for a long time period. In such cases, although the load is not excessive for the power unit per se, the load device may become faulty due to a rise in the internal temperature of the load device, etc. According to the present invention, if the power unit output voltage becomes lower than the aforementioned predetermined value when the power unit is connected to such a load device, the protective device 8 operates to inhibit the power from being supplied to the load device, which enable to protect the load device in such cases described above.

Although, in the embodiment described above, the protective device operates to inhibit the power unit from outputting power, the power unit may be constructed such that the protective device operates to reduce the output power to a certain level.

What is claimed is:

1. An alternating current power unit comprising:
   an alternating current generator means for generating an alternating current output;
   converting/outputting means for converting said alternating current output from said alternating current generator means into a direct current, for then converting said direct current into an alternating current power having a predetermined frequency, and for thereafter outputting said alternating current power, which is supplied to a load device connected to said alternating current power unit;
   load current-detecting means for constantly detecting a current value of said alternating current power supplied from said converting/outputting means to said load device, as a load current;
   output voltage-detecting means for constantly detecting a voltage value of said alternating current power supplied from said converting/outputting means to said load device; and
   protective means for performing a first protective function of restraining or inhibiting said converting/outputting means from outputting said alternating current power when the detected load current exceeds a predetermined current value, and for performing a second protective function of restraining or inhibiting said converting/outputting means from outputting said alternating current power when the detected voltage value has continued to be lower than a predetermined voltage value over a predetermined time period.

2. An alternating current power unit according to claim 1, wherein said protective means comprises:
   a single protective circuit, said single protective circuit comprising input means which is supplied with a first output from said load current-detecting means and a second output from said output voltage-detecting means;
   a first comparator circuit means for determining, based on said first output from said load current-detecting means, whether or not the detected load current exceeds said predetermined current value, and generating a first detection signal when the detected load current exceeds said predetermined current value;
   a second comparator circuit means for determining, based on said second output from said output voltage-detecting means, whether or not the detected voltage value is lower than said predetermined voltage value, and generating a second detection signal when the detected voltage value is lower than said predetermined voltage value; and
   decision means for generating a command signal for restraining or inhibiting said converting/outputting means from outputting said alternating current power when at least one of said first and second detection signals has continued to be generated over a predetermined time period.

3. In a power unit comprising:
   load current-detecting means for constantly detecting an output current supplied from said power unit to a load device connected to said power unit, as a load current;
   protective means for performing a first protective function of reducing or cutting off output power supplied from said power unit to said load device when the detected load current exceeds a predetermined current value; and
   output voltage-detecting means for constantly detecting an output voltage supplied from said power unit to said load device,
   the improvement wherein:
   said protective means comprises means for performing a second protective function of reducing or cutting off said output power when the detected output voltage has continued to be lower than a predetermined voltage value over a predetermined time period; and
   the power unit further comprises an alternating current generator having an output winding; a rectifier circuit means for rectifying an alternating current output from said output winding; driving signal-generating means for generating a driving signal; and invertor circuit means for performing switching control of a direct current output from said rectifier circuit means in response to said driving signal; and an output circuit means for converting an output from said invertor circuit means into an alternating current power having a predetermined frequency and supplying said alternating current power to said load device; and wherein a stop command signal is supplied to said driving signal-generating means to cut off supply of said driving signal to said invertor circuit means.

4. A power unit according to claim 3, wherein said protective means comprises:
   a single protective circuit, said single protective circuit comprising input means which is supplied with a first output from said load current-detecting means and a second output from said output voltage-detecting means;
   a first comparator circuit means for determining, based on said first output from said load current-detecting means, whether or not the detected load current exceeds said predetermined current value, and generating a first detection signal when the detected load current exceeds said predetermined current value;
   a second comparator circuit means for determining, based on said second output from said output voltage-detecting means, whether or not the detected output voltage is lower than said predetermined voltage value, and generating a second detection signal when the detected output voltage is lower than said predetermined voltage value; and
   decision means for generating said stop command signal for inhibiting said power unit from outputting power when at least one of said first and second detection signals has continued to be generated over a predetermined time period.

5. A power unit according to claim 4, wherein:
said input means of said single protective circuit is also supplied with a signal indicative of an output voltage from said alternating current generator; and
said decision means is responsive to said signal indicative of the output voltage from said alternating current generator for not generating said stop command signal before said output voltage from said alternating current generator becomes equal to or higher than a predetermined value.

6. A power unit according to claim 4, wherein said stop command signal is also supplied to said rectifier circuit means to inhibit said rectifier circuit means from operating.

7. A power unit according to claim 3, wherein:
said protective means has an input which is supplied with a signal indicative of an output voltage from said alternating current generator; and
said power unit further comprises decision means responsive to said signal indicative of the output voltage from said alternating current generator for not generating said stop command signal before said output voltage from said alternating current generator becomes equal to or higher than a predetermined value.

8. A power unit according to claim 3, wherein said stop command signal is also supplied to said rectifier circuit means to inhibit said rectifier circuit means from operating.

* * * * *